US010063436B2

(12) United States Patent
Gallagher et al.

(10) Patent No.: US 10,063,436 B2
(45) Date of Patent: *Aug. 28, 2018

(54) METHOD AND APPARATUS FOR SPECTRUM MONITORING

(71) Applicant: MaxLinear, Inc., Carlsbad, CA (US)

(72) Inventors: Timothy Gallagher, Encinitas, CA (US); Patrick Tierney, Solana Beach, CA (US); Jun Huang, San Diego, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,291

(22) Filed: Nov. 2, 2017

(65) Prior Publication Data

US 2018/0054368 A1    Feb. 22, 2018

Related U.S. Application Data

(63) Continuation of application No. 14/948,947, filed on Nov. 23, 2015, now Pat. No. 9,825,826, which is a continuation of application No. 14/341,880, filed on Jul. 28, 2014, now Pat. No. 9,203,653, which is a continuation of application No. 13/607,916, filed on Sep. 10, 2012, now Pat. No. 8,792,008.

(60) Provisional application No. 61/532,098, filed on Sep. 8, 2011.

(51) Int. Cl.
*H04N 17/00* (2006.01)
*H04L 12/26* (2006.01)
*H04B 17/309* (2015.01)
*H04L 12/66* (2006.01)

(52) U.S. Cl.
CPC ......... *H04L 43/08* (2013.01); *H04B 17/309* (2015.01); *H04L 12/66* (2013.01); *H04N 17/00* (2013.01)

(58) Field of Classification Search
CPC ....................................................... H04N 17/00
USPC .................................................. 348/180–192
See application file for complete search history.

(56) References Cited

U.S. PATENT DOCUMENTS

| 5,375,146 | A  | 12/1994 | Chalmers |
| 6,038,435 | A  | 3/2000  | Zhang |
| 6,263,195 | B1 | 7/2001  | Niu et al. |
| 6,813,320 | B1 | 11/2004 | Claxton et al. |

(Continued)

*Primary Examiner* — Paulos M Natnael
(74) *Attorney, Agent, or Firm* — McAndrews, Held & Malloy, Ltd.

(57) ABSTRACT

A receiver is configured to be coupled to a television and data service provider headend via a hybrid fiber coaxial (HFC) network. The receiver comprises front-end circuitry operable to receive a signal that carries a plurality of television and/or data channels, and digitize the received signal to generate a digitized signal. The receiver comprises channelizer circuitry operable to select a first portion of the digitized signal, and select a second portion of the digitized signal. The receiver comprises processing circuitry operable to process the selected second portion of the digitized signal to recover information carried in the plurality of channels. The receiver comprises monitoring circuitry operable to analyze the selected first portion of the digitized signal to measure a characteristic of the received signal; and control the transmission of network management messages back to the headend based on the measured characteristic of the received signal.

20 Claims, 7 Drawing Sheets

(56) References Cited

U.S. PATENT DOCUMENTS

| | | |
|---|---|---|
| 6,904,273 B2 | 6/2005 | Steber et al. |
| 7,057,722 B2 * | 6/2006 | Gehrlein ............ G01N 21/3563 356/328 |
| 7,162,731 B2 * | 1/2007 | Reidhead ................. H04L 1/24 348/180 |
| 7,197,685 B2 | 3/2007 | Limberg |
| 7,418,240 B2 | 8/2008 | Hsu et al. |
| 7,912,158 B2 | 3/2011 | Cahn et al. |
| 8,161,388 B2 | 4/2012 | Rodriguez et al. |
| 8,588,339 B2 | 11/2013 | Birru et al. |
| 8,611,483 B2 | 12/2013 | Zhu et al. |
| 8,792,008 B2 * | 7/2014 | Gallagher ............... H04L 43/08 348/192 |
| 9,026,118 B2 | 5/2015 | Ling |
| 9,142,205 B2 * | 9/2015 | Alderson ............. G10K 11/002 |
| 9,203,653 B2 * | 12/2015 | Gallagher ............... H04L 43/08 |
| 9,320,019 B2 | 4/2016 | Gallagher et al. |
| 9,332,214 B2 | 5/2016 | Ideura et al. |
| 9,584,146 B2 * | 2/2017 | Op 't Eynde ....... H03M 1/1038 |
| 9,825,826 B2 * | 11/2017 | Gallagher ............... H04L 43/08 |
| 2004/0012781 A1 * | 1/2004 | Gehrlein ............ G01N 21/3563 356/328 |
| 2005/0152557 A1 * | 7/2005 | Sasaki .................... H04S 7/302 381/58 |
| 2009/0138966 A1 | 5/2009 | Krause et al. |
| 2009/0168843 A1 | 7/2009 | Waters et al. |
| 2010/0105332 A1 | 4/2010 | McHenry et al. |
| 2010/0171659 A1 | 7/2010 | Waters et al. |
| 2011/0235758 A1 | 9/2011 | Khoini-Poorfard et al. |
| 2012/0163290 A1 * | 6/2012 | Krafft ................ H04B 7/18582 370/316 |
| 2012/0163518 A1 | 6/2012 | Reddy et al. |
| 2013/0063608 A1 * | 3/2013 | Tierney ................... H04L 43/08 348/192 |
| 2013/0287218 A1 * | 10/2013 | Alderson ............ G10K 11/002 381/71.6 |
| 2016/0211861 A1 * | 7/2016 | Op 't Eynde ....... H03M 1/1038 |

* cited by examiner

METHOD AND APPARATUS FOR SPECTRUM MONITORING

PRIORITY CLAIM

This application is a continuation of U.S. patent application Ser. No. 14/948,947 filed Nov. 23, 2015, which is a continuation of U.S. patent application Ser. No. 14/341,880 filed Jul. 28, 2014 (now U.S. Pat. No. 9,203,653), which is a continuation of U.S. patent application Ser. No. 13/607,916 filed Sep. 10, 2012 (now U.S. Pat. No. 8,792,008), which claims priority to U.S. provisional patent application 61/532,098 titled "Method and Apparatus for Spectrum Monitoring" filed on Sep. 8, 2011. Each of the above applications is hereby incorporated herein by reference in its entirety.

INCORPORATION BY REFERENCE

This patent application also makes reference to:
U.S. patent application Ser. No. 13/336,451 titled "Method and Apparatus for Broadband Data Conversion," filed on Dec. 23, 2011, and published as U.S. Patent Application Publication No. 2012/0163518;
U.S. patent application Ser. No. 13/485,003 titled "Multi-layer Time-Interleaved Analog-to-Digital Converter (ADC)," filed on May 31, 2012 and now patented as U.S. Pat. No. 8,611,483; and
U.S. patent application Ser. No. 13/588,769 titled "Multi-Standard Coverage Map Generation," filed on Aug. 17, 2012, and now patented as U.S. Pat. No. 9,026,118.

Each of the above referenced documents applications is hereby incorporated herein by reference in its entirety.

FIELD OF THE INVENTION

Certain embodiments of the invention relate to signal processing. More specifically, certain embodiments of the invention relate to a method and system for spectrum monitoring.

BACKGROUND OF THE INVENTION

Network-based services can become unacceptable if network parameters fall outside of those for which receivers in the network were designed. For example, in a cable television system there are specifications for the number of channels on the plant, the types of channels, the signal levels of those channels and the impairments that can be on the plant that would affect the performance of the receiver. If some or all of these parameters deviate outside acceptable bounds, the user may experience unacceptable performance. Conventional methods and apparatuses for monitoring network parameters are too costly and impractical for use in customer-premises equipment (CPE).

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for spectrum monitoring, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". For example, "x and/or y" means any element of the three-element set $\{(x), (y), (x, y)\}$. Similarly, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof.

Figure 1A:
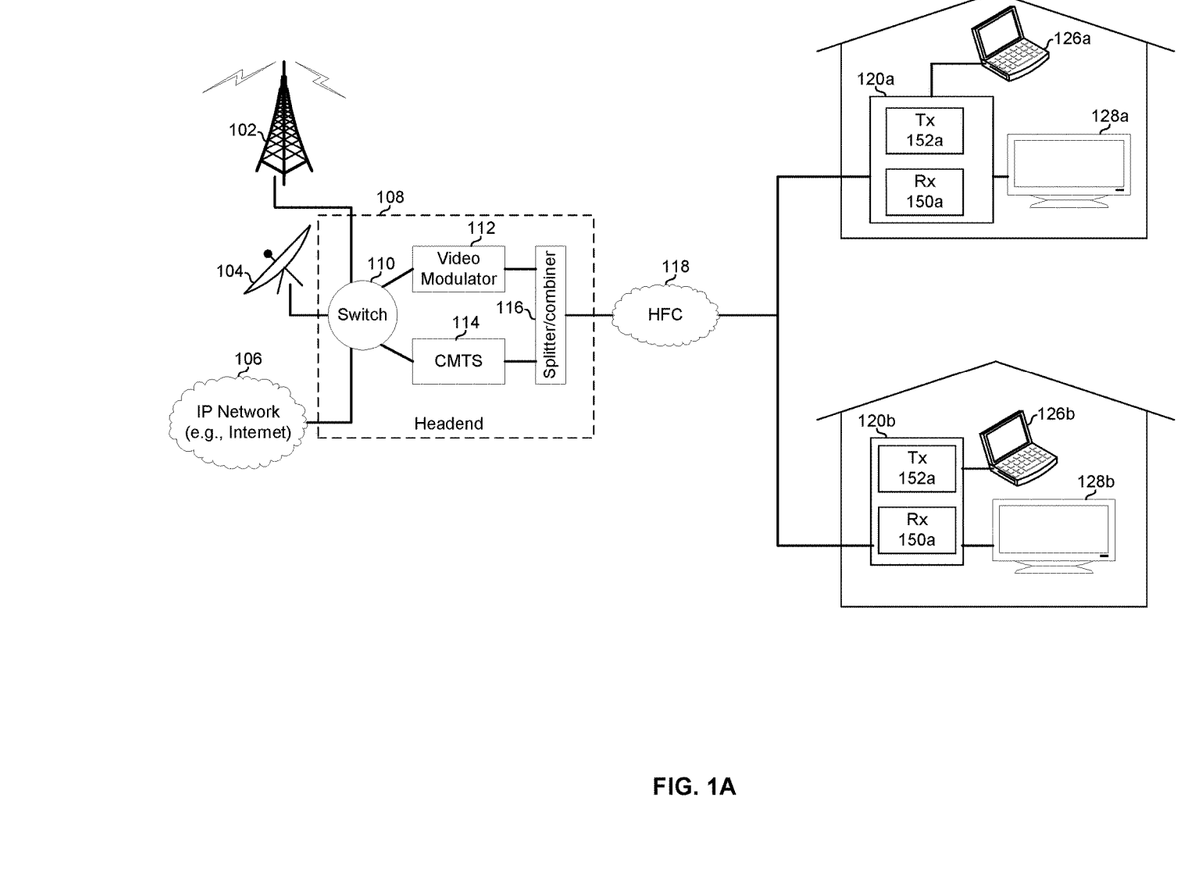
FIG. 1A depicts an example cable system in accordance with an example embodiment of the invention.

FIG. 1A depicts an example communication system in accordance with an example embodiment of the invention. Shown in FIG. 1 is a terrestrial television antenna 102, a satellite dish 104, an Internet Protocol (IP) network 106, a headend 108, a wide area network (e.g., hybrid fiber-coaxial (HFC) network) 118, a gateways 120a and 120b, end systems 126a and 126b (e.g., computers), and end systems 128a and 128b. The headend 108 comprises a switch 110, a video modulator 112, a cable modem termination system (CMTS) 114, and a splitter/combiner 116.

For downstream traffic, the headend 108 may receive television signals via the antenna 102 and the satellite dish 104, and may receive data via the IP network 106. The switch 110 may convey the television signals to the video modulator 112 and the data to the CMTS 114. The video modulator 112 may modulate the received television signals onto a carrier. The CMTS 114 may modulate the received data onto a carrier. The splitter/combiner 116 may combine the outputs of the video modulator 112 and the CMTS 114 resulting in a frequency division multiplexed (FDM) signal comprising one or more television channels and/or one or more DOCSIS channels. The FDM signal may be onto the wide area network (WAN) 118 for distribution to customer premise equipment (CPE). Each of the gateways 120a and 120b may comprise a receive module 150 operable to process the received FDM signal as described below.

In an example embodiment, each of the gateways 120a and 120b may be operable to transmit, via a module 152, messages to the CMTS 114. For such upstream data, the gateways 120a and 120b may modulate messages (e.g., network management/maintenance messages) onto one or more carriers for transmission via the WAN 118. The splitter/combiner 116 may then convey the message to the CMTS 114. The CMTS 114 may process the messages and, in an example embodiment, adjust transmission parameters (e.g., modulation parameters, transmit power, frequency offsets, etc.) and/or perform other maintenance/management based on the received messages.

Figure 1B:
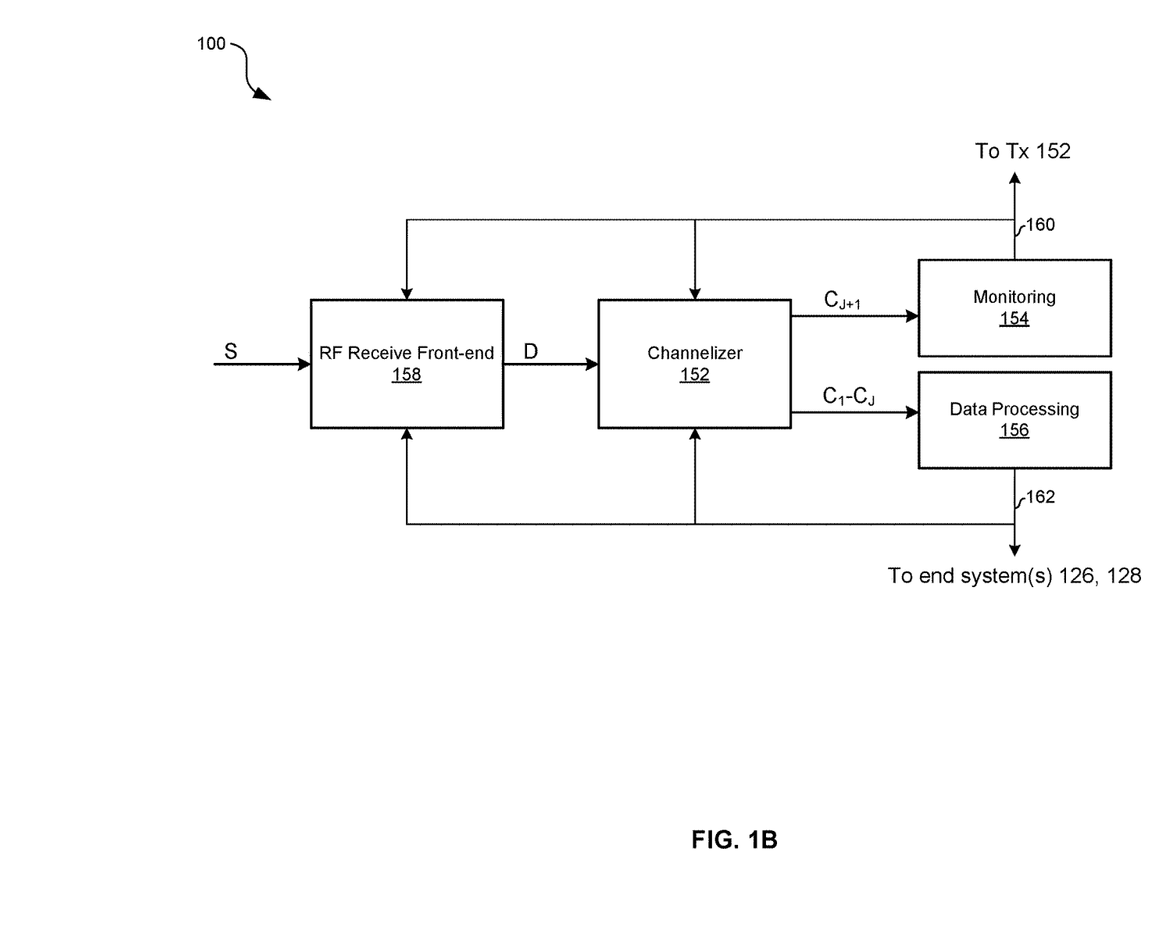
FIG. 1B depicts an example receiver operable to perform spectrum monitoring in accordance with an example embodiment of the invention.

FIG. 1B depicts an example receiver operable to perform spectrum monitoring in accordance with an example embodiment of the invention. Shown in FIG. 1B is a receiver circuit 100 comprising an RF receive front-end module 158, a channelizer module 102, a monitoring module 154, and a data processing module 156.

Figure 2A:
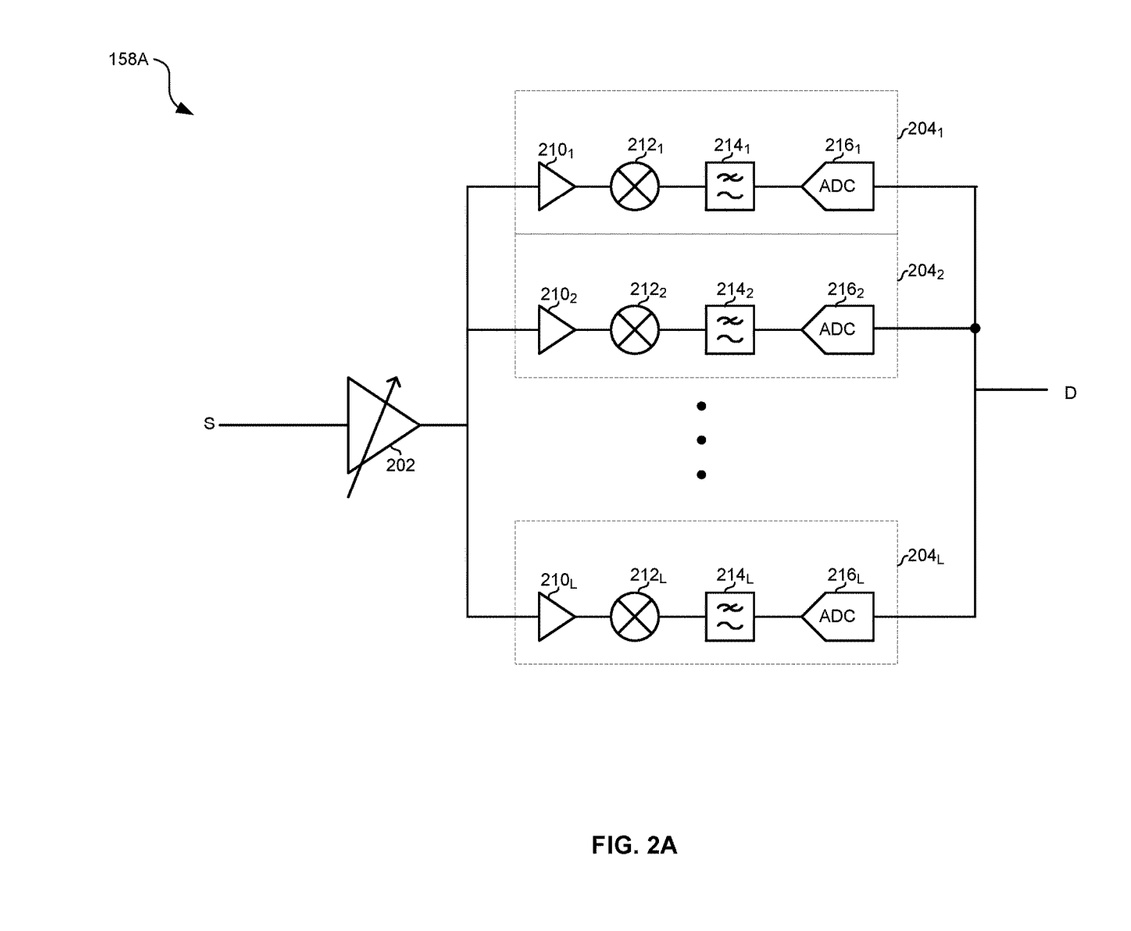
FIG. 2A depicts an example RF front-end of a receiver operable to perform spectrum monitoring in accordance with an example embodiment of the invention.
Figure 2B:
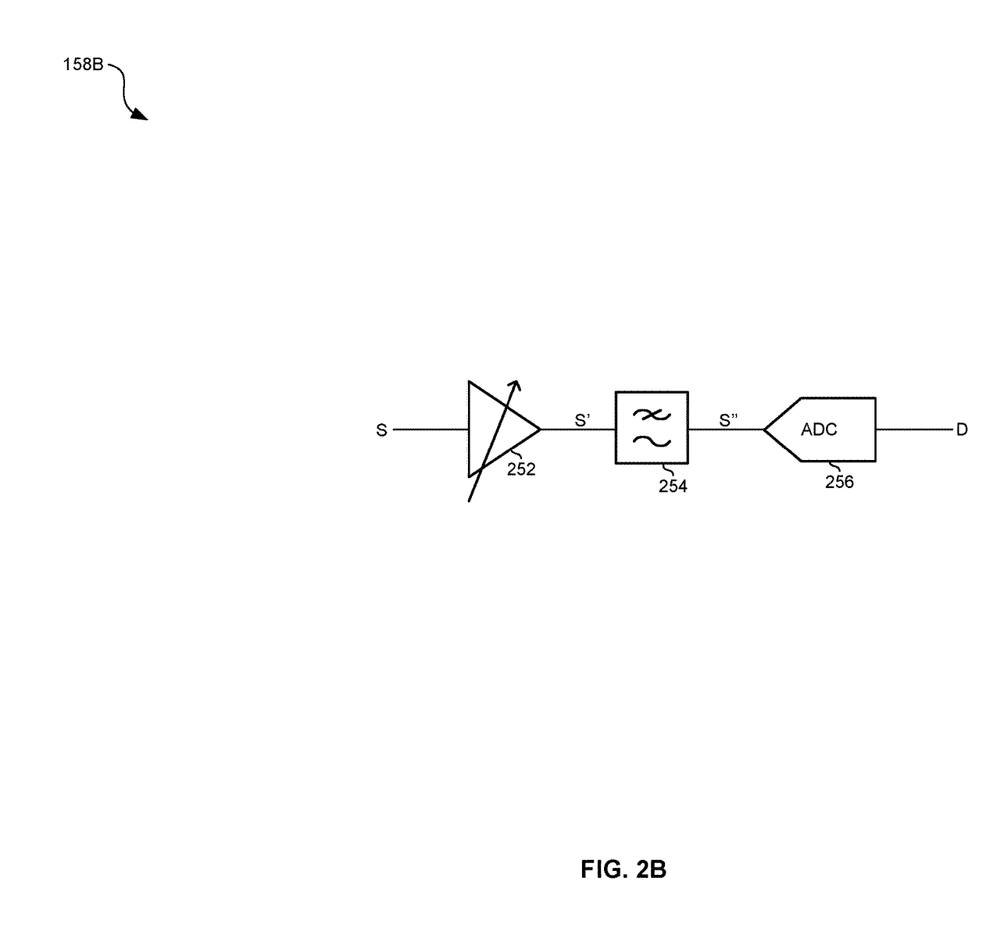
FIG. 2B depicts another example RF front-end of a receiver operable to perform spectrum monitoring in accordance with an example embodiment of the invention.

The RF receive front-end 158 may be operable to process a received RF signal S to generate a digital signal D. The signal S may be the result of a plurality of television and/or DOCSIS channels being frequency division multiplexed into a single signal. The signal S may occupy a frequency band from $F_{lo}$ to $F_{hi}$. The RF front-end 158 may, for example, amplify, down-convert, filter, and/or digitize the received signal S to generate the digital signal D. Example embodiments of the RF front-end are depicted in FIGS. 2A and 2B.

Figure 3:
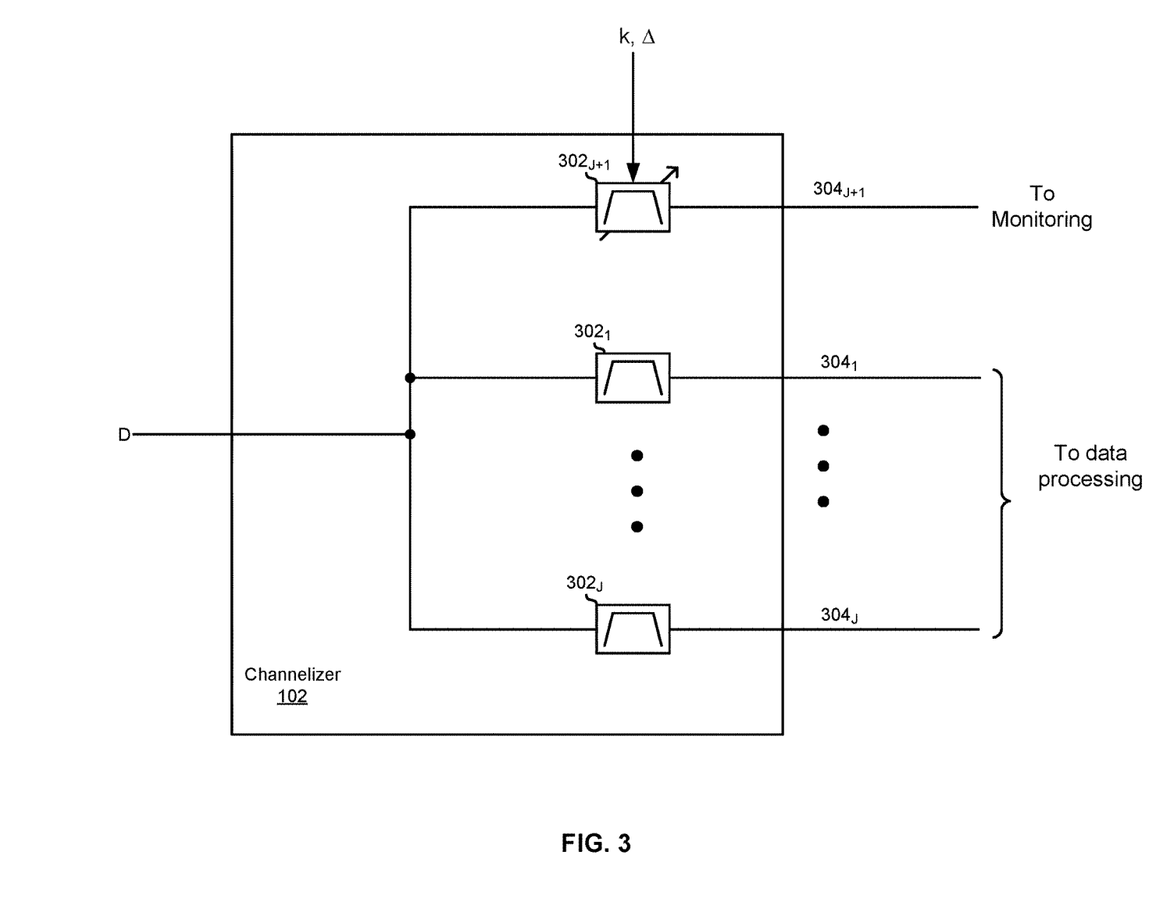
FIG. 3 depicts an example channelizer which may be utilized for performing spectrum monitoring in accordance with an example embodiment of the invention.

The channelizer 102 may be operable to select J+1 bands (represented as $C_1$-$C_{J+1}$) of the signal S and output each of the selected bands to the monitoring module 154 and/or the data processing module 156, where J is an integer greater than 1. An example embodiment of the channelizer 102 is depicted in FIG. 3. Each band $C_j$ may, for example, correspond to the frequency band of one or more television channels. For example, each band $C_j$ may be an integer multiple of 6 MHz (U.S.) or 8 MHz (EU).

In an example embodiment, the channelizer 102 may be implemented entirely in the digital domain and the channelization may be achieved via one or more digital filtering algorithms and/or other digital signal processing algorithms.

The monitoring module 154 may be operable to analyze the band $C_{J+1}$ that it receives from the channelizer 102 to measure/determine characteristics such as, for example, signal power level vs. frequency, delay vs. frequency, phase shift vs. frequency, type and/or amount of modulation, code rate, interference levels, signal to noise ratio, a transfer function of the channel of over which the signal was received, an impulse response of the channel over which the signal was received, and/or any other characteristic that may help assess characteristics of the channel over which the signal was received, assess characteristics of the transmitter that sent the signal and/or any otherwise be pertinent to performance of the communication system. The monitoring module may also be operable to generate one or more control signals 160 for configuring the channelizer 102 and/or for configuring the RF front-end 158. Additionally or alternatively, the control signal(s) 160 output by the monitoring module 154 may control the transmission of network management/maintenance messages by the device 150. Such message may comprise, for example, network status updates indicating whether one or more communication parameters of one or more received television or DOCSIS channels are outside acceptable bounds, and/or conveying measured/ determined characteristics back to a source of the received signal (e.g., back to a cable headend), In an example embodiment, the monitoring module 174 may be operable to demodulate signals for measuring one or more characteristics such as signal-to-noise ratio, code rate.

The data processing module 156 may be operable to process the bands $C_1$-$C_J$ conveyed to it by the channelizer 102 to recover data present in one or more television channels present in those bands of the signal S. The data processing module 156 may, for example, perform synchronization, equalization, and decoding. The data processing module 156 may output processed data (e.g., MPEG transport stream packets and/or Internet Protocol packets) to end systems 126, perhaps via an interface such as an HDMI interface and/or an Ethernet interface (not shown). The data processing module 156 may also be operable to generate one or more control signals 162 for configuring the channelizer 102 and/or the receive front-end 158.

The parallel arrangement of the monitoring module 154 and data processing module 156 may enable determination of signal and/or channel characteristics without having to interrupt service to user equipment 126 and 128.

In an example embodiment, the signal S may be a cable television signal with $F_{lo} \approx 55$ MHz, $F_{hi} \approx 1002$ MHz. In an example embodiment, the signal S may be a MoCA signal with $F_{lo} \approx 1150$ MHz and $F_{hi} \approx 2100$ MHz. These numbers are purely for illustration and not intended to be limiting.

In an example embodiment, the signal S may be a satellite television signal such as may be at the input of a LNB, at the output of a LNB, or at the input of a indoor unit (e.g., set top box). In such an embodiment, the front-end 158, channelizer 152, data processing module 154, and/or monitoring module 154 may reside in the indoor unit (e.g., set-top box), outdoor unit (e.g., satellite dish or accompanying components), and/or may be distributed among the indoor unit and outdoor unit of a satellite installation residing at a customer premises. An example of such an embodiment is shown in FIG. 1C.

In operation of such an example embodiment, the signal S may be amplified, possibly downconverted, and digitized by the RF front-end 158 to generate the signal D. The channelizer 102 may then select J bands of the signal D for output to the data processing module 156. Each of the selected bands $C_1$-$C_J$ may, for example, comprise one or more of the cable television channels and/or one or more of the DOCSIS channels that make up the signal S. The data processing module 156 may provide one or more control signals to determine which portion of the signal D is selected for each of the bands $C_1$-$C_J$. The selection may be based, for example, on which television channels are being consumed by end systems 128 and/or whether DOCSIS data is being consumed by end systems 126. The channelizer 102 may also select one band, represented as band $C_{J+1}$, to be output to the monitoring module 154. Band $C_{J+1}$ may comprise any portion or portions (including the entire bandwidth from $F_{lo}$ to $F_{hi}$) of the signal D. Which portion of the signal S is selected as band $C_{J+1}$ may, for example, be configured by the monitoring module 154. The data processing module 156 may process one or more of bands $C_1$-$C_J$ to recover data on one or more channels (e.g., television and/or DOCSIS channels) present in those bands while the monitoring module 154 may concurrently process band $C_{J+1}$ to measure/ determine characteristics of all or a portion of the signal S between $f_{lo}$ and $f_{hi}$.

Figure 1C:
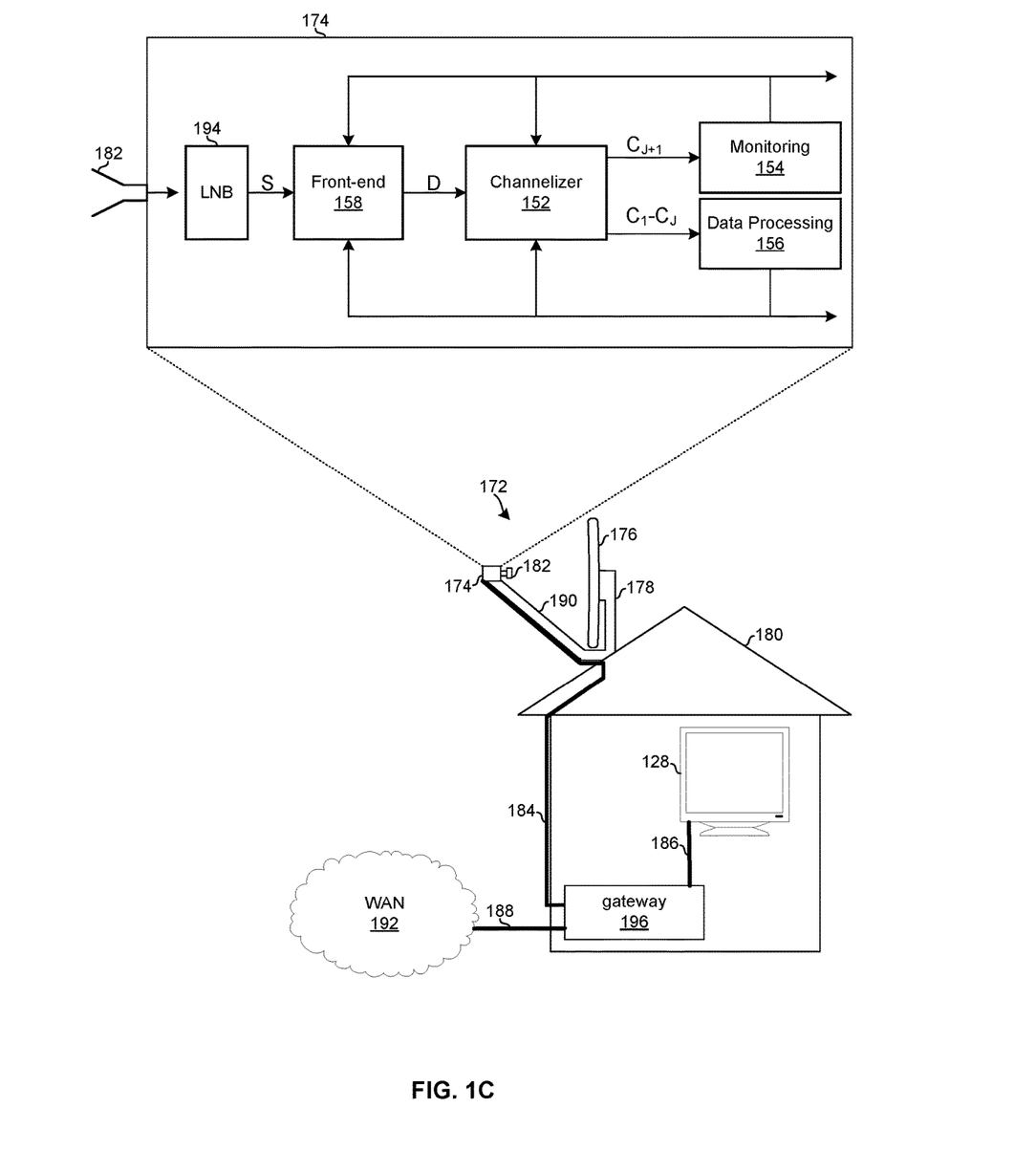
FIG. 1C depicts an example satellite system in accordance with an example embodiment of the invention.

FIG. 1C depicts an example satellite system in accordance with an example embodiment of the invention. Shown in FIG. 1C is a satellite dish assembly 172, and a gateway 196.

The subassembly 174 comprises a feed horn 182, an LNB 194, the front-end 158, the channelizer 152, the monitoring module 154, and the data processing module 156. The various modules of the subassembly 174 may reside in one or more housings, on one or more printed circuit boards, and/or one or more integrated circuits (e.g., one or more silicon dice). In another example embodiment, the monitoring module 154 and/or the data processing module 156 may reside in the gateway 196.

In the example embodiment depicted, the satellite dish assembly 172 comprises a parabolic reflector 176 and a subassembly 174 mounted (e.g., bolted or welded) to a support structure 178 which, in turn, comprises a boom 190 and attaches (e.g., via bolts) to the premises 180 (e.g., to the roof). In another example embodiment, all or a portion of the modules 152, 154, and/or 156 may be mounted to the premises 180 separate from the satellite dish (e.g., connected via wired and/or wireless connections), but may still be part of the "outdoor unit."

The gateway 196 may receive data from the satellite dish assembly 172 (via cable(s) 184). The gateway and may transmit data onto and receive data from the WAN 192 (via broadband connection 188). The gateway 196 may transmit data to and receive data from user equipment 128 and 126 (via one or more connections 186).

FIG. 2A depicts an example RF front-end of a receiver operable to perform spectrum monitoring in accordance with an example embodiment of the invention. The RF front-end 158A shown in FIG. 2A comprises a variable gain amplifier 202, and receive chains $204_1$-$204_L$, where L is an integer greater than or equal to 1. Each receive chains $204_1$ may comprise an amplifier module $210_1$, a mixer module $212_1$, a filter module $214_1$, and an analog-to-digital converter (ADC) module $216_1$, where 1 is an integer between 1 and L.

Each amplifier $210_1$ may be operable to amplify a band 1 of the signal S. Each mixer $212_1$ may be operable to mix a band 1 of the signal S with a local oscillator signal (not shown) to downconvert the band 1 to a lower frequency. Each filter module $214_1$ may be operable to bandpass filter the band 1 to remove/attenuate frequencies outside band 1. Each ADC 216 may be operable to convert the band 1 of the analog signal S to a corresponding digital representation. Operation of the RF front-end 158 and/or processing of signals generated by the front-end 158, may, for example, be as described in U.S. patent application Ser. No. 13/336,451 entitled "Method and Apparatus for Broadband Data Conversion" which is incorporated by reference herein, as set forth above.

In an example embodiment, the front-end 158A may reside in a cable gateway such as the cable gateway 120 described above. In an example embodiment, the front-end 158A may reside in satellite gateway/set-top box and/or in an outdoor unit of a satellite reception assembly (e.g., collocated on-chip or on-PCB with a satellite low-noise block downconverter (LNB)).

FIG. 2B depicts another example RF front-end of a receiver operable to perform spectrum monitoring in accordance with an example embodiment of the invention. The RF front-end 158B shown in FIG. 2B comprises a variable gain amplifier 252, a filter 254, and an ADC 256. Functions performed by the RF front-end 158B may be referred to as "full-spectrum capture" (or "FSC").

In the front-end 158B, the entire bandwidth, from $F_{lo}$ to $F_{hi}$, of signal S may be amplified by the amplifier 252 to generate S'. The amplified signal S' may be then filtered by the filter 254 to remove undesired signals outside of $F_{lo}$ to $F_{hi}$ and generate signal S". The signal S", from $F_{lo}$ to $F_{hi}$, may then be digitized by the ADC 256 to generate signal D. In an example embodiment, the ADC may be as described in U.S. patent application Ser. No. 13/485,003 entitled "Multi-layer Time-Interleaved Analog-to-Digital Converter (ADC)," which is incorporated by reference herein, as set forth above.

In an example embodiment, the ADC 256 may be capable of digitizing a signal S wherein $F_{lo}$ to $F_{hi}$ is 1 GHz or higher. Accordingly, for cable television/DOCSIS, the ADC 256 may be operable to digitize the entire cable downstream (e.g., from ~55 MHz to ~1002 MHz). Similarly, for satellite television, the ADC 256 may be operable to digitize the received signal at the input of the LNB, and/or the downconverted signal (e.g., from ~1 GHz to ~2 GHz) at the output by an LNB.

FIG. 3 depicts an example channelizer which may be utilized for performing spectrum monitoring in accordance with an example embodiment of the invention. Band selection filters $302_1$-$302_J$ of the channelizer 102 may each process the signal D to recover a corresponding one of the J selected bands of the signal D, and output the band on a corresponding one of the ports $304_1$ to $304_J$. A band selection filter $302_{J+1}$ of the channelizer 102 may process the signal D to recover band $C_{J+1}$ from the signal D, and output band $C_{J+1}$ on the port $304_{J+1}$. Which band or bands are selected by the filter $302_{J+1}$ may be configured based on one or more control signals input to the channelizer 102. For example, the value of a parameter k may determine the center frequency of the portion of signal D that is to be selected as $C_{J+1}$ by the filter $302_{J+1}$, and the value of $\Delta$ may determine the bandwidth of the portion of this signal D that is selected as band $C_{J+1}$ for output on the port $304_{J+1}$. In this manner, all of the signal D between $F_{lo}$ and $F_{hi}$ or any portion or portions of the signal D, may be selected for output on the port $304_{J+1}$.

Figure 4:
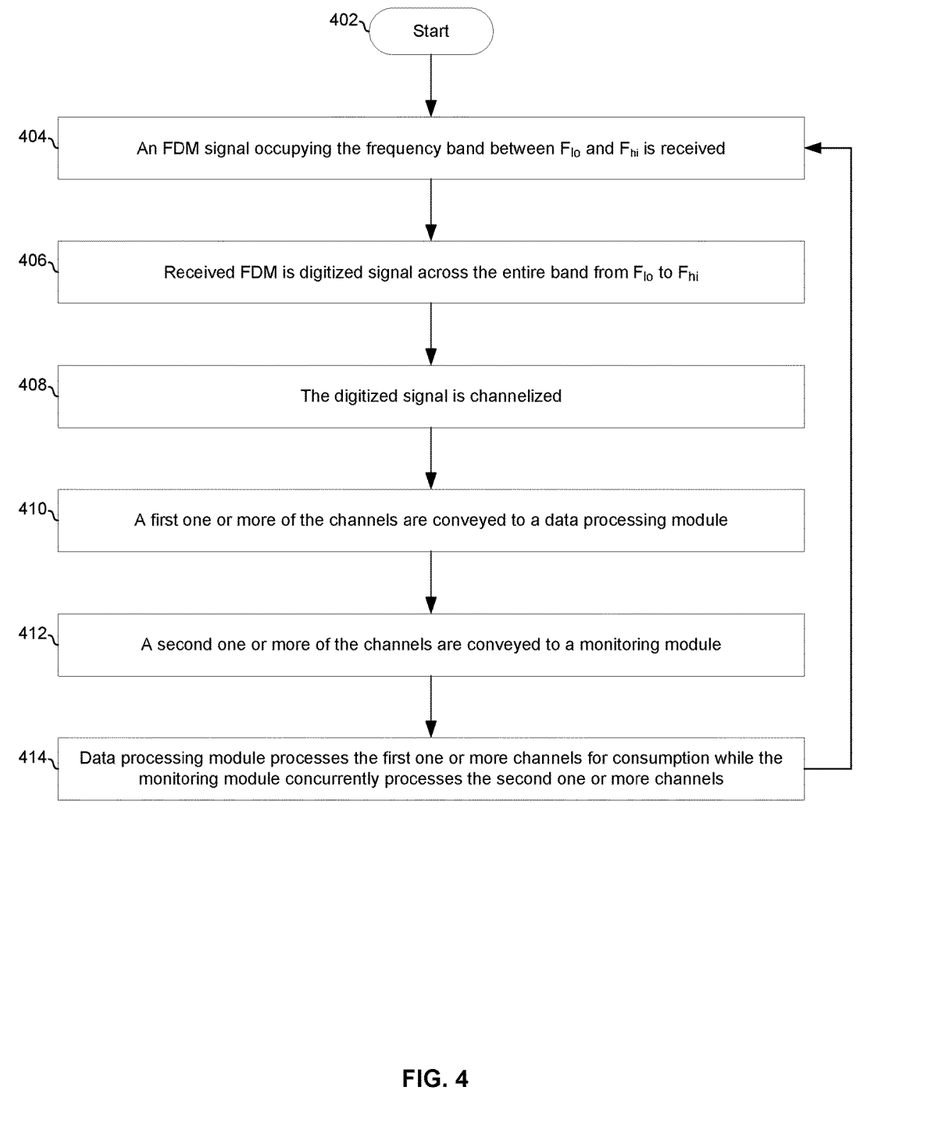
FIG. 4 is a flow chart illustrating example steps for spectrum monitoring in accordance with an example embodiment of the invention.

FIG. 4 is a flow chart illustrating example steps for spectrum monitoring in accordance with an example embodiment of the invention. After start step 402, in step 404, the receiver circuit 100 may receive a frequency division multiplexed (FDM) signal comprising one or more channels (e.g., satellite television channels, cable television channels, and/or DOCSIS channels) occupying a frequency band between $F_{lo}$ and $F_{hi}$. In step 406, the received FDM signal is digitized across the full band from $F_{lo}$ to $F_{hi}$. In step 408, the digitized signal is channelized into one or more bands. In step 410, a first one or more of the bands are conveyed to a data processing module. In step 412 a second one or more of the bands are output to a monitoring module. In step 414, the data processing module processes one or more of the first one or more bands to recover data on those bands while the monitoring module concurrently processes the second one or more bands to determine characteristics of all or a portion of the frequency band from $F_{lo}$ to $F_{hi}$.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for spectrum monitoring Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   an analog-to-digital converter operable to digitize a plurality of channels comprising one or both of television channels and data channels;
   a channelizer operable to select a first portion and a second portion of the digitized plurality of channels;
   analysis circuitry operable to measure a characteristic of the plurality of channels according to the first portion of the digitized signal;
   processing circuitry operable to recover information carried in the plurality of channels according to the second portion of the digitized signal; and
   a transmitter operable to control a transmission of a network management message according to the measured characteristic, wherein the measured characteristic is different than the network management message.

2. The system of claim 1, wherein the plurality of channels are received from a television and data service provider headend via a hybrid fiber coaxial (HFC) network.

3. The system of claim 1, wherein the network management message indicates whether a parameter is outside of acceptable bounds.

4. The system of claim 3, wherein the parameter is a modulation parameter of the plurality of channels.

5. The system of claim 3, wherein the parameter is a transmit power of the plurality of channels.

6. The system of claim 3, wherein the parameter is a frequency offset of the plurality of channels.

7. The method of claim 1, wherein the characteristic is signal power vs. frequency.

8. The method of claim 1, wherein the characteristics is signal phase vs. frequency.

9. The system of claim 1, wherein the characteristic is one of: signal-to-noise ratio, peak-to-average ratio, noise levels, bit error rate, and symbol error rate.

10. The system of claim 1, wherein the channelizer is operable to configure a bandwidth and/or center frequency of the first portion of the digitized plurality of channels while the plurality of channels are being digitized.

11. A method comprising:
    digitizing a plurality of channels comprising one or both of television channels and data channels by using an analog-to-digital converter;
    selecting a first portion and a second portion of the digitized plurality of channels by using a channelizer;
    measuring a characteristic of the plurality of channels according to the first portion of the digitized signal by using analysis circuitry;
    recover information carried in the plurality of channels according to the second portion of the digitized signal by using processing circuitry; and
    controlling a transmitter that transmits a network management message according to the measured characteristic, wherein the measured characteristic is different than the network management message.

12. The method of claim 11, wherein the plurality of channels are received from a television and data service provider headend via a hybrid fiber coaxial (HFC) network.

13. The method of claim 11, wherein the network management message indicates whether a parameter is outside of acceptable bounds.

14. The method of claim 13, wherein the parameter is a modulation parameter of the plurality of channels.

15. The method of claim 13, wherein the parameter is a transmit power of the plurality of channels.

16. The method of claim 13, wherein the parameter is a frequency offset of the plurality of channels.

17. The method of claim 11, wherein the characteristic is signal power vs. frequency.

18. The method of claim 11, wherein the characteristics is signal phase vs. frequency.

19. The method of claim 11, wherein the characteristic is one of: signal-to-noise ratio, peak-to-average ratio, noise levels, bit error rate, and symbol error rate.

20. The method of claim 11, wherein the method comprises configuring a bandwidth and/or center frequency of the first portion of the digitized plurality of channels while the plurality of channels are being digitized.

* * * * *